United States Patent [19]

Monroe

[11] 4,101,360
[45] Jul. 18, 1978

[54] METHOD AND APPARATUS FOR FOLDING AND FUSING THE ELEMENTS OF A SLIDE FASTENER STRING

[75] Inventor: Lawrence S. Monroe, Meadville, Pa.

[73] Assignee: Textron Inc., Providence, R.I.

[21] Appl. No.: 780,214

[22] Filed: Mar. 22, 1977

Related U.S. Application Data

[62] Division of Ser. No. 699,210, Jun. 23, 1976, Pat. No. 4,025,277.

[51] Int. Cl.² .............................................. B29C 19/04
[52] U.S. Cl. .................................. 156/200; 156/274; 156/380; 156/461; 264/25
[58] Field of Search .............................. 156/272–275, 156/380, 200, 201, 461, 180, 441, 66; 24/205.13 C, 205.13 D, 205.13 R, 205.15 R; 264/295, 25; 425/174 R, 174.2, 174.6, 814, 394

[56] References Cited

U.S. PATENT DOCUMENTS

| 2,822,575 | 2/1958 | Imbert et al. | 156/274 X |
| 2,841,852 | 7/1958 | Burbank | 24/205.13 C |
| 2,871,911 | 2/1959 | Goldsworthy et al. | 156/441 X |
| 3,267,514 | 8/1966 | Porepp | 24/205.13 C |
| 3,445,915 | 5/1969 | Cockson et al. | 264/295 X |
| 3,993,724 | 11/1976 | Takamatsu | 264/295 X |

*Primary Examiner*—David A. Simmons
*Attorney, Agent, or Firm*—O'Brien & Marks

[57] ABSTRACT

An apparatus for folding the coupling elements of a slide fastener string includes a pair of electrodes connected to a source of high frequency electromagnetic energy and a series of guide sections. The string is drawn through the guides and the coupling elements are heated and softened by the electromagnetic field and folded by the guides.

2 Claims, 12 Drawing Figures

U.S. Patent  July 18, 1978  Sheet 1 of 3  4,101,360
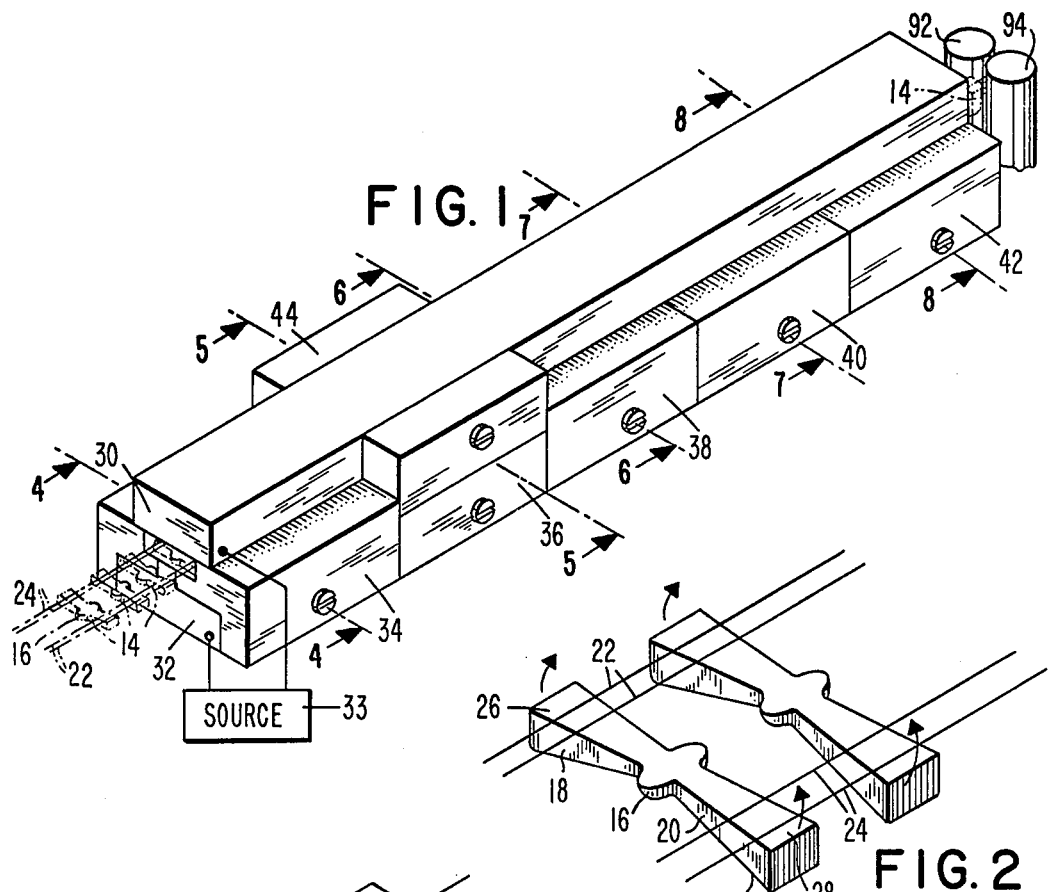
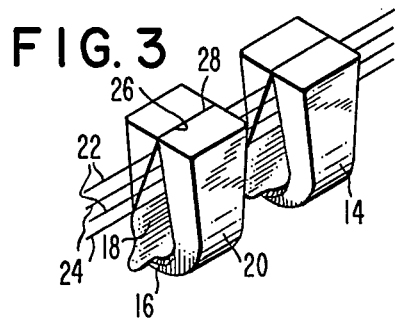
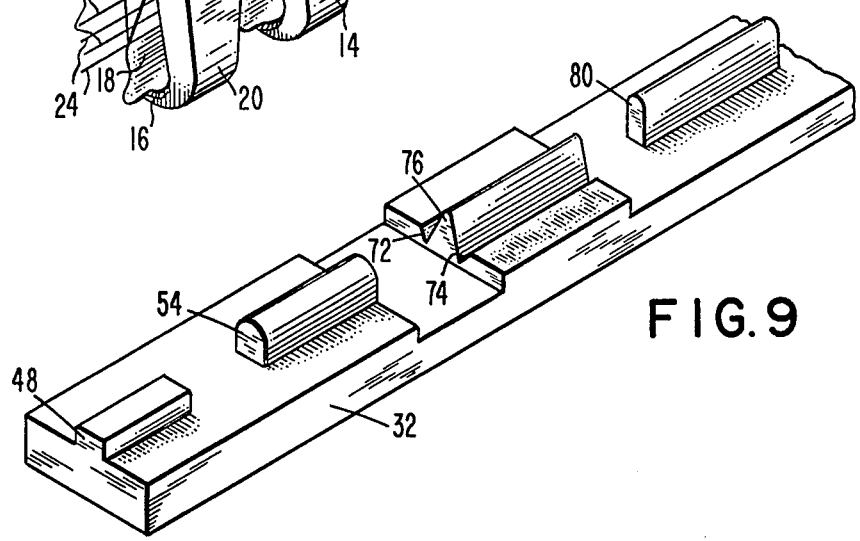

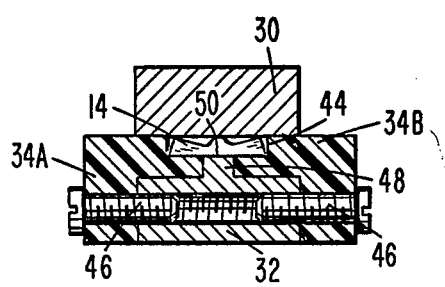
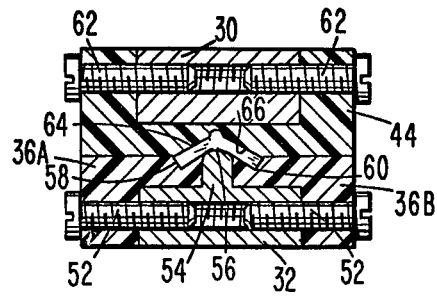
FIG.4　　　　FIG.5
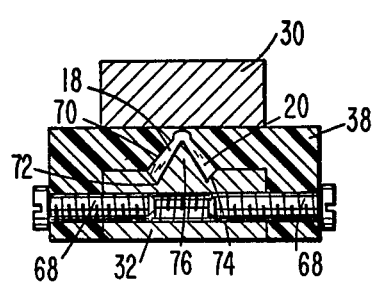
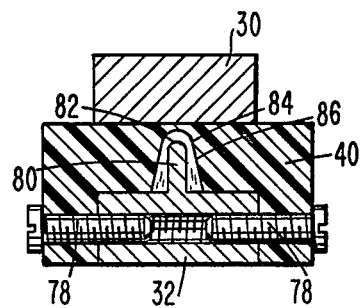
FIG.6　　　　FIG.7
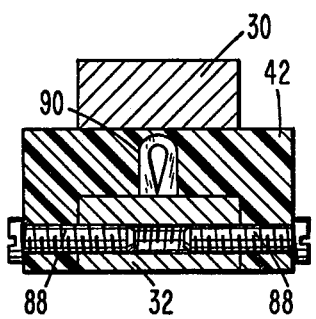
FIG.8

METHOD AND APPARATUS FOR FOLDING AND FUSING THE ELEMENTS OF A SLIDE FASTENER STRING

CROSS-REFERENCE TO RELATED APPLICATION

This application is a divisional application of the pending prior application Ser. No. 799,210 filed June 23, 1976 now U.S. Pat. No. 4,025,277.

BACKGROUND OF THE INVENTION

1. Field of the Invention

The individual coupling elements of slide fastener strings are now often molded on apparatus in which it is efficient and economical to form the coupling elements in a string with the elements in a flat configuration. It then becomes necessary to fold the legs of the coupling elements to form the elements into a configuration usable in a slide fastener installation.

2. Description of the Prior Art

The prior art, as exemplified by U.S. Pat. Nos. 3,039,408, 3,431,337, 3,445,915 and 3,672,805, is generally cognizant of apparatus for shaping slide fastener elements by heating and bending. Previous attempts at folding molded coupling elements have included apparatus that use large heated wheels against the periphery of which the coupling elements were forced in order to bend them. These devices were large, complicated and difficult to maintain and often created undesirable scars or markings on the finished product.

SUMMARY OF THE INVENTION

The present invention is summarized in that an apparatus for folding thermoplastic coupling elements of a slide fastener string includes a first electrode, a second electrode spaced from the first electrode, the first and second electrodes adapted to being energized from a source of electromagnetic energy to create an electromagnetic field therebetween, and guide means located between the first and second electrodes and through which the string is drawn, the guide means progressively folding the coupling elements as they are drawn therethrough.

It is an object of the present invention to provide an apparatus for folding slide fastener coupling elements that is compact, simple and easy to maintain.

It is another object of the present invention to construct such an apparatus that is precise in its folding of the slide fastener coupling elements without marking or scarring the coupling elements.

It is yet another object of the present invention to provide a method of folding slide fastener elements that is quicker, easier and more reliable than previously known methods.

Other objects, advantages and features will become apparent from the following description when taken in conjunction with the accompanying drawings.

BRIEF DESCRIPTION OF THE DRAWINGS

FIG. 1 is a perspective view of an apparatus constructed according to the present invention;

FIG. 2 is a perspective view of the slide fastener string as it enters the apparatus of FIG. 1;

FIG. 3 is a perspective view of the slide fastener string as it leaves the apparatus of FIG. 1;

FIG. 4 is a cross-sectional view along the line 4—4 in FIG. 1;

FIG. 5 is a cross sectional view along the line 5—5 in FIG. 1;

FIG. 6 is a cross sectional view along the line 6—6 in FIG. 1;

FIG. 7 is a cross sectional view along the line 7—7 in FIG. 1

FIG. 8 is a cross sectional view along the line 8—8 in FIG. 1;

FIG. 9 is a perspective view of the lower electrode of the apparatus of FIG. 1;

DESCRIPTION OF THE PREFERRED EMBODIMENT

Figure 10:
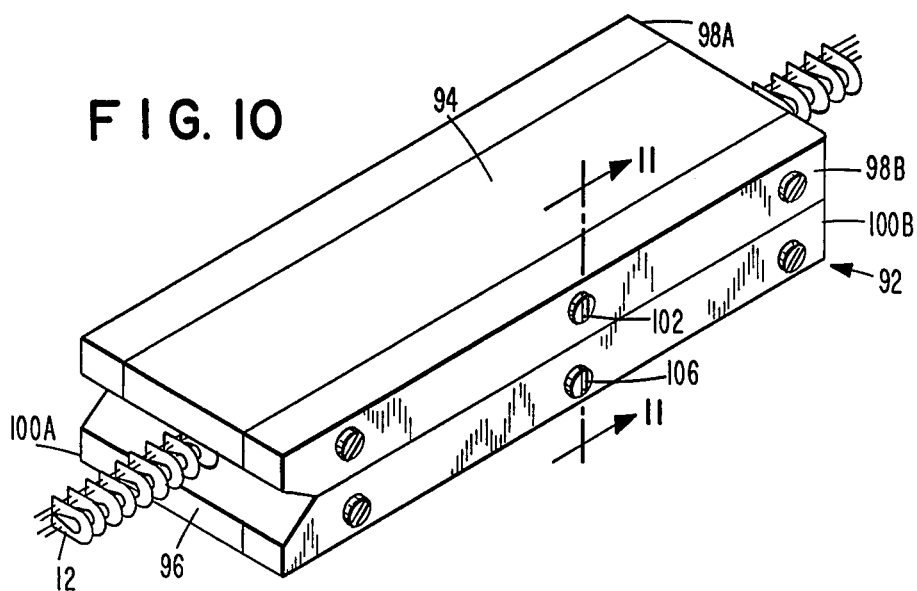
FIG. 10 is a perspective view of an optional additional apparatus to be used with the apparatus of FIG. 1.

As is shown in FIG. 1, the present invention is embodied in an apparatus and method for the dielectric heating and progressive folding of a string 12 of slide fastener coupling elements. A string 12 enters the apparatus, indicated generally at 10, in the configuration as shown in FIG. 2, is heated and then progressively folded until it is withdrawn from the apparatus 10 in the configuration as shown in FIG. 3.

The string 12, in the configuration of both FIGS. 2 and 3, includes a series of spaced-apart molded thermoplastic slide fastener coupling elements 14. Each of the coupling elements 14 includes a head portion 16 from which extends a pair of legs 18 and 20. In the configuration of FIG. 2, the legs 18 and 20 extend away from the head portion 16 in diametrically opposite directions, while in the configuration of FIG. 3, the legs 18 and 20 extend generally in the same direction away from the head portion 16, the legs 18 and 20 being slightly bent toward each other. A first pair of mounting threads 22 extending parallelly through the leg 18 of each of the coupling elements 14, and similarly, a second pair of mounting threads 24 extends through the leg 20 of each of the coupling elements 14. The pairs of mounting threads 22 and 24 connect the individual coupling elements 14 together to form the string 12 and also serve to allow the string 12 to be installed as a slide fastener by suitable attachment of the threads 22 and 24 to a mounting tape or fabric. Each of the legs 18 and 20 terminates in a respective heel portion 26 and 28. In the configuration of the coupling elements 14 in FIG. 2, the heel portions 26 and 28 are located at opposite extremities of the coupling element 14 while in the configuration of FIG. 3, the heel portions 26 and 28 have been brought into abutment.

The apparatus 10 for heating and folding the string 12 includes, as is shown in FIGS. 1 and 4 through 8, an upper elongate electrode 30 and a lower elongate electrode 32. The upper electrode 30 and the lower electrode 32 are both connected to a suitable source of high frequency electrical energy 33 of a type well known to the art, so as to create an electromagnetic high frequency field between the electrodes. The electrodes 30 and 32 may be constructed of any suitable conductive material, but it has been found that brass combines in the most favorable balance the desirable properties of a conductivity, strength and malleability. Secured to the lower electrode 32 are a series of lower bending guide sections 34, 36, 38, 40 and 42. Attached to the upper electrode 30 opposite the lower guide section 36 is an upper bending guide section 44. All of the guide sections 34, 36, 38, 40, 42 and 44 are constructed of a suitable dielectric material. One particularly advantageous material combining good strength and higher wear resistance with low friction and low dielectric losses has been found to be ultra high molecular weight polyethylene.

The heating and folding apparatus 10 of FIG. 1 can be roughly divided into five stages corresponding to the lower guide sections 34, 36, 38, 40 and 42. FIGS. 4 through 8 represent cross sections through each respective one of the stages of the apparatus 10. FIG. 9 shows the lower electrode 32 alone so that the arrangement of these stages on the electrode can be clearly seen.

An initial heating stage of the apparatus 10 is shown in cross section in FIG. 4. A rectangular channel 44 is defined in the lower guide section 34 into which the chain 12 is introduced. The lower guide section 34 is formed of a pair of guide section halves 34A and 34B each of which is secured to the lower electrode 32 by suitable mounting means, such as machine screws 46. Projecting upward from the lower electrode 32 and between the guide section halves 34A and 34B is a projection 48 which terminates in a flat upper surface 50 which contacts the head portions 16 of the coupling elements 14 as they are drawn through the channel 44. Preferably the upper surface 50 of the projection 48, and all other electrode surfaces in contact with the coupling elements 14, are coated with a low friction coating, such as pressure sensitive Telfon tape, to reduce drag and friction on the string 12 as it is pulled through the apparatus 10.

In FIG. 5 an initial bending stage of the apparatus 10 is shown in cross-section. The lower guide section 36 is again formed of a pair of guide section halves 36A and 36B each of which is secured to the lower electrode 32 by a mounting means, such as machine screws 52. A projection 54 extends upward from the lower electrode 32 between the guide section halves 36A and 36B and terminates in a curved upper surface 56. Each of the guide section halves 36A and 36b has formed on its upper surface roughly V-shaped grooves 58 and 60 receiving the respective legs 18 and 20 of the coupling elements 14. The upper guide section 44 is secured to the upper electrode 30 by mounting means such as machine screws 62. The upper guide section 44 is formed as a unitary piece and has formed in its lower surface facing the lower electrode 32 a large shallow V-shaped groove 64 for receiving the head portion 16 of the coupling elements 14. The grooves 58 and 60 in the lower guide section halves 36A and 36B and the groove 64 in the upper guide section 44 combine to form a chain-receiving channel 66, that is slightly bent or angled.

In FIG. 6, a first intermediate bending stage of the apparatus 10 is shown in cross-section. The lower guide section 38 is formed as a unitary piece mounted on the lower electrode 32 by mounting means in the form of machine screws 68. A chain-receiving channel 70 bent at approximately a right angle is defined between the guide section 38 and the lower electrode 32 and includes a large V-shaped groove in the inside surface of the guide section 38 to receive the head portions 16 of the coupling elements 14 and two smaller V-shaped grooves 72 and 74 formed in the lower electrode 32 to receive the legs 18 and 20 of the coupling elements 14. A projection 76 in the form of a rounded inverted V extends upward from the lower electrode 32 between the grooves 72 and 74.

In FIG. 7, a second intermediate bending stage of the apparatus 10 is shown in cross section. The lower guide section 40 is a unitary piece secured to the lower electrode 32 by mounting means such as machine screws 78. A projection 80 with a rounded upper surface 82 extends upward from the lower electrode 32 for a distance approximately equal to the length of the legs 18 and 20 of the coupling elements 14. A large rounded U-shaped groove 84 is formed in the lower surface of the guide section 40 so as to define a U-shaped chain-receiving channel 86 between it and the projection 80. The sides of the chain receiving channel 86 diverge slightly in the direction of the lower electrode 32.

In FIG. 8, a final bending and set stage of the apparatus 10 is shown in cross-section. The lower guide section 42 is a unitary piece secured to the lower electrode 32 by machine screws 88, and has formed in it a U-shaped chain-receiving channel 90. The sides of the chain-receiving channel 90 are generally parallel as they extend to the lower electrode 32.

Following the final bending and set stage of the apparatus 70 is a pair of grooved, elastomer-covered rollers 92 and 94 between which the string 12 passes. These rollers are driven by suitable drive means and are the main drive of the apparatus 10 as they pull the string 12 through the apparatus.

Figure 11:
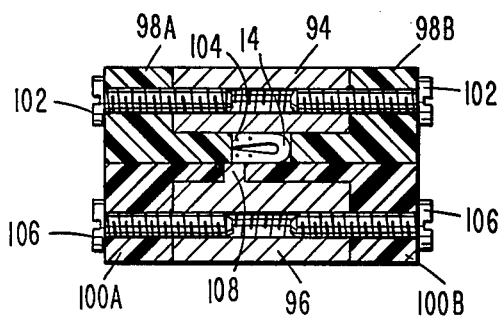
FIG. 11 is a cross-sectional view along the line 11—11 in FIG. 10.
Figure 12:
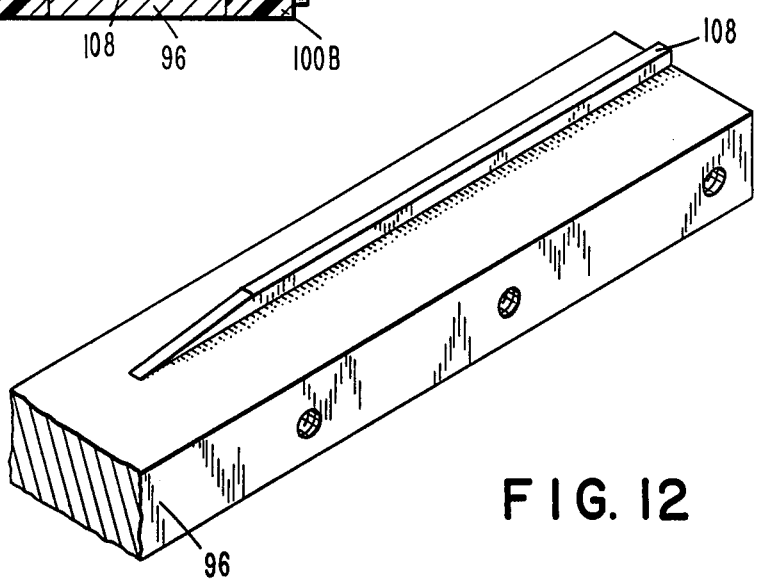
FIG. 12 is a perspective view of the lower electrode of FIG. 10.

After the coupling elements 14 have been folded and set in their folded shape in the apparatus 10, the string 12 may then optionally be fed through a heel fusing apparatus, indicated generally at 92 in FIG. 10. As can be seen in FIG. 10, the string 12 enters the heel fusing apparatus 92 with the coupling elements 14 oriented so that the heel portions 26 and 28 point to one side and is drawn through the apparatus 92 in that orientation. The heel fusing apparatus 92 includes an upper electrode 94 and a lower electrode 96 which are again connected to the source 33 (not shown in FIG. 10). A pair of upper guide section halves 98A and 98B surround the upper electrode 94 while a pair of lower guide section halves 100A and 100B surround the lower electrode 96. The electrodes 94 and 96 are again preferably made of brass while the guide section halves 98A, 98b, 100A and 100B are preferably formed of ultra high molecular weight polyethylene. The upper guide section halves 98a and 98B are secured to the upper electrode 94 by securing means 102 and the lower guide section halves 100A and 100B are secured to the lower electrode by securing means 106. As can be seen best in FIG. 11, the upper guide section halves 98A and 98B extend over the bottom surface of the upper electrode 94 but leave a recess 104 between them to receive the coupling elements 14. The lower guide section halves 100A and 100B extend over the top surface of the lower electrode 96 but terminate against an electrode projection 108. The electrode projection 108, as can be seen in FIGS. 11 and 12, is an upstanding projection from the top surface of the bottom electrode 96 that runs longitudinally along the bottom electrode 96 and is positioned relative to the recess 104 so that it is adjacent the heel portions 26 and 28 of the coupling elements 14.

In its operation, the initial heating stage of FIG. 4 functions to initially heat the thermoplastic material of the coupling elements 14 so that the elements can be folded. The thermoplastic material of the coupling elements 14 is heated by the electromagnetic field created between the electrodes due to dielectric losses in the material. The thermoplastic material becomes softer and more pliable as it is heated thereby becoming easier to bend and fold in the subsequent bending operations. The projection 48 abuts the head portion 16 of each of the coupling elements 14 so that the electromagnetic field generated between the electrodes 30 and 32 is concentrated at the head portion 16, to ensure that the thermoplastic material in that portion is heated sufficiently, since the majority of the bending of the coupling element 14 will occur in or near the head portion 16.

In FIG. 5 the progressive folding of the coupling element 14 has been initiated. The sides of the groove 64 in the upper guide section 44 force the legs 18 and 20 of the coupling element 14 down into the grooves 58 and 60 in the lower guide section halves 36A and 36B at the same time as the head portion 16 of the coupling element is held in place by the projection 54. The curved upper surface 56 serves to spread the bend of the coupling element 14 over a region adjacent the head portion 16 to prevent the entire bending from occurring at a single point to thereby prevent weakening the coupling element 14.

As the string 12 is drawn through the first intermediate folding stage of FIG. 6, the sides of the channel 70 in the lower guide section 38 force the legs 18 and 20 of the coupling element 14 into the grooves 72 and 74 in the lower electrode 32. The entire channel 70 forces the coupling element into a right-angled configuration against the projection 76, the coupling element 14 being bent at the head portion 16.

In the section intermediate bending stage of the apparatus 10, as is shown in FIG. 7, the legs 18 and 20 of the coupling element 14 have been drawn nearly parallel. Again the U-shaped groove 84 forces the coupling element 14 to be pressed directly against the projection 80. The rounded upper surface 82 of the projection 80 insures that the coupling element 14 is bent in a smooth, curved fashion.

In the final bending and set stage of FIG. 8 the heel portions 26 and 28 have been forced together by the channel 90. The legs 18 and 20 are bent slightly toward each other so that the heel portions 26 and 28 touch, or are at least very close. Very little bending is accomplished at this stage so that the thermoplastic material, which is still heated by the electromagnetic field, has a chance to set or cure in its new configuration before it is cooled. This final bending and set stage can thus be made as long as necessary to ensure that the plastic in the coupling elements 14 has the fullest chance to cure in its new configuration so that there will be no tendency for the coupling elements 14 to unbend.

After leaving the apparatus 10, the string can optionally be drawn through the heel fusing apparatus 92 to further secure the coupling elements 14 in their new shape. The string 12 is twisted 90° and is drawn through the heel fusing apparatus 92. The string 12 passes through the recess 104 between the electrodes 94 and 96 which are energized by the electromagnetic energy therebetween which is concentrated by the electrode projection 108 in area of the heel portions 26 and 28. The heel portions 26 and 28 are thereby fused together so that they are permanently joined to each other to further prevent the coupling element 14 from ever unbending. If desired, rather than being constructed as a separate apparatus, the heel fusing apparatus 92 could be constructed as a continuation of the apparatus 10, with the electrodes 94 and 96 being extensions of the electrodes 30 and 32.

Thus the apparatus of the present invention is relatively simple and accomplishes the heating and folding of thermoplastic coupling elements of a slide fastener chain in a manner that is quick and efficient. It is compact, includes few moving parts, and is exact and reliable inasmuch as all the coupling elements are drawn through a common channel to fold them. Also, due to the durable character of the brass electrodes and the polyethylene guide sections, very little maintenance is required for the apparatus.

Inasmuch as the subject invention is subject to many modifications, variations, and changes in detail, it is intended that all the material in the foregoing specification or accompanying drawings be interpreted in an illustrative manner but not in a limiting sense.

What is claimed is:

1. A method of folding the thermoplastic coupling elements of a slide fastener string comprising the steps of generating a high frequency electromagnetic field between a pair of spaced electrodes, pulling the slide fastener string through the field between the electrodes to heat and soften the coupling elements, initially concentrating the electromagnetic field at the point on each of the coupling elements at which the folding is to take place guiding the coupling elements to a folded position by drawing the coupling elements through a plurality of guide sections, each of the guide sections progressively folding each of the coupling elements, and drawing the string through a set stage in which the folded coupling elements are cured in their folded position.

2. A method of folding the thermoplastic coupling elements of a slide fastener string as claimed in claim 1 further including the step of fusing the heel portions of the folding coupling element together to secure the coupling elements in their folded configuration.

* * * * *